United States Patent Office 2,801,943
Patented Aug. 6, 1957

2,801,943

COMPOSITION OF MATTER FOR SOLDERING ALUMINUM

Meyer L. Freedman, Cleveland, Ohio, assignor to Horizons Incorporated, Princeton, N. J., a corporation of New Jersey No Drawing. Application April 15, 1955,
Serial No. 501,739

8 Claims. (Cl. 148—23)

This invention relates to a composition useful in joining aluminum and its alloys. More particularly, it relates to a flux in paste form which may be applied either as the means for soldering or may be used together with a solder to effect the joining of aluminum members.

In the application of soldering fluxes, many forms have been employed in the prior art. For example, among the expedients employed has been casting the flux in the form of a rod or stick for ease of application; pelleting of flux compositions; the use of free-flowing finely divided flux powders and also the use of pastes or thin slurries. The soldering composition of my invention relates specifically to a paste which can be extruded from a collapsible tube or which can be applied by a brush in the form of a thin layer. When the flux composition is in the form of a paste it may be very conveniently applied to the localized area where it is desired that it be used without waste and without the mess usually associated with other prior art soldering processes.

Many soldering compositions are known in which the principal ingredients consist of one or more alkali metal chlorides or ammonium chloride and one or more metal chlorides which react with the aluminum to be soldered or brazed whereby a thin adherent film of metal is deposited on the aluminum by a simple displacement reaction with the active chloride, the deposited metal serving to facilitate the joining of the aluminum to another member. In such mixtures, the relative proportions of the various chlorides are varied within wide limits as is well known, according to the particular intended use. To assist in the application of such compositions to the base metal, pastes have been made up consisting of an organic liquid and the several chlorides, but the performance of these pastes has been unsatisfactory in many instances, particularly at higher temperatures, e. g. 275° C., because of the relatively critical amount of organic material which may be employed—too much leaves a large char residue and too little does not produce a spreadable paste.

I have discovered a composition of matter which is particularly useful in joining aluminum and its alloys and which comprises a mixture of a major amount of a chloride of at least one metal which is electropositive with respect to aluminum and a minor amount of at least one chloride of the group consisting of ammonium chloride, lithium chloride, sodium chloride and potassium chloride and which contains a sufficient amount of a lower alcohol and of an n-alkyl primary amine having at least 12 carbon atoms in the chain to form an extrudable composition. The alcohol should be present in amounts up to 25% by weight and the amine should form between 0.1 and 0.5% by weight of the mixture.

I have discovered that n-alkyl primary amines which contain at least 8 and preferably more than 12 carbon atoms may be added to advantage to mixtures of heavy metal chlorides and ammonium chloride containing about up to 25% by weight of methanol. The n-alkyl primary amine may be added to the flux directly or in the form of their salts with mineral acids or with organic acids of low molecular weight. These substances decompose at the temperature of reaction bonding although the residue has been found not to interfere with the joining process. Because of the carbonaceous residue, it is preferred to limit the amount of such amines or amine salts to less than 2% by weight of the total composition. The amount of primary amine must be sufficient to render the alcohol-containing mixture of chlorides readily extrudable. I have found that amounts between at least about 0.1% by weight and about 0.5% by weight have the desired effect, although I presently prefer to employ between about 0.1 and 0.2% by weight of the amine. Various amines may be employed but I have found stearylamine and stearylamine acetate to be particularly effective.

In compositions prepared in accordance with my invention, the amount of methanol is important. Since it ignites during the soldering operation, I prefer to employ the minimum amount necessary for forming a smooth paste in any particular combination of chlorides, which is generally below about 25% by weight. Other lower alcohols such as ethanol may be substituted for some or all of the methanol.

The effectiveness of my flux may be further enhanced by the incorporation therein of approximately 1% by weight of the mixture of chlorides of polymethylsiloxane or polyethylsiloxane which tends to reduce hygroscopicity of the mixture.

I have found that for many purposes, a mixture of zinc chloride, stannous chloride and ammonium chloride in the proportions of about 3:1:1 parts by weight to be particularly useful in many joining applications. The relative proportions of the several ingredients may, however, be varied somewhat from the preferred ratio given above, as follows:

| | Percent by weight |
|---|---|
| Zinc chloride | 45–75 |
| Stannous chloride | 15–25 |
| Ammonium chloride | 15–25 |

In addition to the chloride constituent, the above flux contains both a lower alcohol and a primary fatty amine and may, as above indicated, advantageously include a polyalkylsiloxane.

When the ingredients are suitably proportioned, no appreciable amount of residue is formed when it is used for the joining of aluminum or aluminum alloy members.

The following examples will serve to further illustrate compositions prepared in accordance with my invention:

*Example I*

125 grams of stannous chloride were dissolved by warming with 110 milliliters of methanol, the warm solution was added to 375 grams of zinc chloride and the mixture heated to 155° C. to obtain a clear solution. 125 grams of powdered NH₄Cl were stirred into the solution at 155° C. The powder must be added slowly with vigorous stirring to prevent formation of lumps. A solution of 1.2 grams stearylamine acetate in 10 milliliters of methanol was then added together with 10 grams of a polymethylsiloxane (DC 200 silicone oil). The mixture was rapidly cooled to 75° C. with vigorous stirring and 50 milliliters methanol added. The fluid mixture at 70°–80° C. was poured into polyethylene tubes. A smoother paste is obtained by more rapid chilling. However, the mixture as prepared was sufficiently fluid for extrusion through the 3/16" orifice of the polyethylene tubes. The 770 grams of paste had a volume of 400 milliliters and a corresponding density of 1.9. A "one ounce" tube contained 60 grams of paste. The final composition was as follows:

| | Weight, grams | Percent by weight |
|---|---|---|
| $ZnCl_2$ | 375 | 48.7 |
| $SnCl_2$ | 125 | 16.2 |
| $NH_4Cl$ | 125 | 16.2 |
| Methanol | 135 | 17.5 |
| Stearylamine acetate | 1.2 | 0.16 |
| Polymethylsiloxane (viscosity 1,000 centipoises at 25° C.) | 10 | 1.3 |
| | 771.2 | |

The above composition was applied to the common surfaces of two pieces of aluminum positioned in the form of a T and heated. When heated to 700° F., a strong bond was readily formed without the use of any solder.

*Example II*

A paste was formed from approximately one part by weight of methanol ($CH_3OH$) and 3 parts by weight of a mixture comprising 60 parts by weight of zinc chloride ($ZnCl_2$), 20 parts by weight of stannous chloride ($SnCl_2$), and 20 parts by weight of ammonium chloride ($NH_4Cl$) to which approximately ½ part by weight of stearylamine had been added. The paste was employed as a flux when soldering aluminum with various conventional stick solder compositions and was found to function effectively to give a very clean, even tinning without char or residue. One outstanding property of this flux was the consistently good results obtained with high zinc solders such as 96% Zn—4% Al and 70% Zn—30% Sn solders which require relatively high temperatures to melt the solders. With such solders, prior art fluxes commercially available, left large residues which in some instances were found to interfere with the bonding.

The expression "reaction type chloride flux" as employed in the claims which follow is intended to describe compositions which are made up of a major amount of a chloride of at least one metal which is electropositive with respect to aluminum, that is a chloride which is decomposed by metallic aluminum, such as the conventionally employed heavy metal chlorides; and a minor amount of at least one chloride of the group consisting of ammonium chloride, lithium chloride, sodium chloride and potassium chloride.

I claim:

1. A soldering paste for joining aluminum members consisting essentially of a mixture of zinc chloride, stannous chloride and ammonium chloride in the relative proportion of about 3:1:1 parts by weight, and containing up to 25% by weight of the mixture of a lower alcohol from the group consisting of methanol and ethanol and between about 0.1% and 0.5% by weight of the mixture of a primary amine from the group consisting of stearylamine and stearylamine acetate.

2. A soldering paste for joining aluminum members consisting essentially of a major amount of a mixture containing between about 15% and 25% by weight of ammonium chloride, between about 15% and 25% by weight of stannous chloride, and between about 45% and 75% by weight of zinc chloride, up to 25% by weight of methanol, and between about 0.1% and 0.5% of a primary amine from the group consisting of stearylamine and stearylamine acetate, based on the weight of the said mixture.

3. An aluminum soldering paste composition consisting essentially of at least about 80% by weight of a mixture containing between about 15% and 25% by weight of ammonium chloride, between about 15% and 25% by weight of stannous chloride, between about 45% and 75% by weight of zinc chloride, between about 0.1% and 0.5% by weight of an n-alkyl primary amine containing at least 12 carbon atoms in the chain, and up to about 25% by weight of a lower alcohol.

4. An aluminum soldering paste composition consisting essentially of at least about 80% by weight of a reaction type halide flux, up to about 25% by weight of a lower alcohol and between about 0.1% and 0.5% by weight of an n-alkyl primary amine having at least 12 carbon atoms in the chain.

5. An aluminum soldering paste composition consisting essentially of at least about 80% by weight of a reaction type halide flux, up to about 25% by weight of methanol, between about 0.1 and 0.5% by weight of a primary amine from the group consisting of stearylamine and stearylamine acetate.

6. An aluminum soldering paste composition consisting essentially of at least about 80% by weight of a reaction type chloride flux, up to about 25% by weight of methanol, between about 0.1% and 0.5% by weight of stearylamine, and approximately 1% by weight of a polyalkylsiloxane.

7. An aluminum soldering paste composition consisting essentially of at least about 80% by weight of a reaction type chloride flux, about 0.1% and 0.5% by weight of stearylamine acetate, approximately 1% by weight of a polyalkylsiloxane and the remainder methanol.

8. An aluminum soldering paste composition consisting essentially of at least about 80% by weight of a reaction type chloride flux, between about 0.1% and 0.5% by weight of stearylamine, and the remainder methanol.

References Cited in the file of this patent

UNITED STATES PATENTS

| 1,785,155 | Taylor | Dec. 16, 1930 |
| 1,949,916 | McQuaid | Mar. 6, 1934 |
| 2,238,069 | Miller | Apr. 5, 1941 |

FOREIGN PATENTS

| 684,081 | Great Britain | Dec. 10, 1952 |